US012258784B2

(12) United States Patent
Darling et al.

(10) Patent No.: US 12,258,784 B2
(45) Date of Patent: Mar. 25, 2025

(54) DOOR STRIKE PLATE SENSOR

(71) Applicant: Instant Care, Inc., San Diego, CA (US)

(72) Inventors: Richard Darling, Poway, CA (US); George Seelman, Temecula, CA (US); Steven Stallard, Escondido, CA (US); Fong Chang, Diamond Bar, CA (US)

(73) Assignee: Instant Care, Inc., San Diego, CA (US)

( * ) Notice: Subject to any disclaimer, the term of this patent is extended or adjusted under 35 U.S.C. 154(b) by 206 days.

(21) Appl. No.: 18/058,428

(22) Filed: Nov. 23, 2022

(65) Prior Publication Data

US 2023/0160230 A1 May 25, 2023

Related U.S. Application Data

(60) Provisional application No. 63/264,514, filed on Nov. 24, 2021.

(51) Int. Cl.
*E05B 17/22* (2006.01)
*E05B 15/02* (2006.01)
*E05B 47/00* (2006.01)

(52) U.S. Cl.
CPC .......... *E05B 17/22* (2013.01); *E05B 15/0205* (2013.01); *E05B 47/00* (2013.01); *E05B 2047/0068* (2013.01); *E05B 2047/0069* (2013.01)

(58) Field of Classification Search
CPC .... E05B 15/00; E05B 15/0205; E05B 15/021; E05B 17/00; E05B 17/22; E05B 39/00; E05B 45/00; E05B 47/00; E05B 47/0001; E05B 2047/0067; E05B 2047/0068; E05B 2047/0069
USPC .......................................................... 70/263
See application file for complete search history.

(56) References Cited

U.S. PATENT DOCUMENTS

2004/0207210 A1* 10/2004 Luker ................ E05B 47/0012 292/144
2019/0145130 A1* 5/2019 Affan .................... E05B 47/026 292/144
2020/0073320 A1* 3/2020 Ishida ................ G03G 21/1614

FOREIGN PATENT DOCUMENTS

EP 1473425 A2 11/2004
EP 1672150 A2 6/2006
EP 3388602 A1 * 10/2018 ............ E05B 41/00

OTHER PUBLICATIONS

International Search Report and Written Opinion relating to application No. PCT/US2022/080391, dated Mar. 29, 2023.

* cited by examiner

*Primary Examiner* — Nathan Cumar
(74) *Attorney, Agent, or Firm* — Honigman LLP; Grant Griffith

(57) ABSTRACT

A door position detector including a strike plate mounted onto a door frame. The strike plate includes a back face that opposes the door frame and a front face disposed on an opposite side of the strike plate than the back face and opposing an edge of a door when the door is in a closed position. The door position detector further including a door position sensor integrated with the strike plate, the door position sensor configured to detect a state of the door.

25 Claims, 5 Drawing Sheets

DOOR STRIKE PLATE SENSOR

CROSS REFERENCE TO RELATED APPLICATIONS

This U.S. patent application claims priority under 35 U.S.C. § 119(e) to U.S. Provisional Application 63/264,514, filed on Nov. 24, 2021. The disclosure of this prior application is considered part of the disclosure of this application and is hereby incorporated by reference in its entirety.

TECHNICAL FIELD

This disclosure relates to a door strike plate sensor.

SUMMARY

One aspect of the disclosure provides a door position detector including a strike plate mounted onto a door frame. The strike plate includes a back face that opposes the door frame and a front face disposed on an opposite side of the strike plate than the back face and opposing an edge of a door when the door is in a closed position. The door position detector further including a door position sensor integrated with the strike plate, the door position sensor configured to detect a state of the door.

Implementations of the disclosure may include one or more of the following optional features. In some implementations, the door position sensor is configured to detect at least one of a door open state, a door closed state, a locked state, or an unlocked state. In other implementations, the door position sensor includes a capacitance sensor, inductance sensor, a proximity sensor, infrared (IR) reflected sensor, hall effect sensor, magnoresistive sensors, radar, light sensor, or temperature sensor.

The door position detector may further include a communication interface integrated with the strike plate, the communication interface configured to transmit the state of the door detected by the door position sensor to a remote device. Alternatively, the door positions detector may further include a control circuit integrally formed with the strike plate.

In some implementations, the door position detector includes a control circuit disposed on the strike plate or embedded into the strike plate. In these implementations, the control circuit may include a substrate and the door position sensor may be disposed on the substrate. In these implementations, the substrate may include a printed circuit board (PCB). Alternatively in these implementations, data processing hardware may be disposed on the substrate, the data processing hardware including at least one of an integrated circuit, a digital signal processor (DSP) chip, or a system on a chip (SoC). In these implementations, the substrate may define a planar face that is substantially parallel with planar surfaces defined by the front and back faces of the strike plate. Further, in these implementations, the substrate may be inserted into a mortise hole and may define a substantially cylindrical or rounded shape, the substrate may define a longitudinal axis that aligns with a longitudinal axis of the mortise hole. In these implementations, a mortise housing may be inserted into the mortise hole and enclosing the substrate.

The door position detector may further include an energy storage device configured to power components of the door position detector. In some implementations, the strike plate includes a lip portion that protrudes from the front and back faces of the strike plate, the lip portion including a strike surface and a non-strike surface disposed on an opposite side of the lip portion than the strike surface, the strike surface configured to initiate contact with a strike latch of the door when the door is transitioning into the closed position. In these implementations, the door position detector may further include a control circuit embedded into the lip portion of the strike plate or disposed on the non-strike surface of the lip portion of the strike plate. In these implementations, the back face of the strike plate may be in direct contact with the door frame. Alternatively in these implementations, the control circuit may include a substrate and the door position sensor may be disposed on the substrate. In these implementations, the substrate may define a surface area that is less than or equal to a surface area defined by the non-strike surface of the lip portion of the strike plate. Alternatively in these implementations, the substrate may include a printed circuit board (PCB). In these implementations, data processing hardware may be disposed on the substrate, the data processing hardware including at least one of an integrated circuit, a digital signal processor (DSP) chip, or a system on a chip (SoC). In these implementations, the substrate may define a contour that follows a contour of the non-strike surface of the lip portion of the strike plate. In these implementations, the lip portion of the strike plate may be angled relative to planar surfaces defined by the front and back faces of the strike plate.

In some implementations, the door position detector further includes one or more additional door position sensors integrated with the strike plate, each of the one or more additional door position sensors configured to detect the state of the door. In these implementations, the one or more additional door position sensors may include at least one of the strike plate or a face plate mounted onto the edge of the door.

Another aspect of the disclosure provides for a door position detector including a face plate mounted onto an edge of a door. The face plate including a back face that opposes the edge of the door and a front face disposed on an opposite side of the back face and opposing a door frame when the door is in a closed position. The door position detector further includes a door position sensor integrated with the face plate, the door position sensor configured to detect a state of the door.

This aspect may include one or more of the following optional features. The door position sensor may be configured to detect at least one of a door open state, a door closed state, a locked state, or an unlocked state. The door position sensor may include a capacitance sensor, inductance sensor, a proximity sensor, infrared (IR) reflected sensor, hall effect sensor, magnoresistive sensors, radar, light sensor, or temperature sensor. In some implementations, the door position detector includes a communication interface integrated with the face plate, the communication interface configured to transmit the state of the door detected by the door position sensor to a remote device.

The door position detector may further include a control circuit integrally formed with the face plate. The door position may further include an energy storage device configured to power components of the door position detector.

In some implementations, the door position detector includes a control circuit disposed on the face plate or embedded into the face plate. In these implementations, the control circuit may include a substrate and the door position sensor may be disposed on the substrate. In these implementations, the substrate may include a printed circuit board (PCB). Alternatively in these implementations, the door position detector may include data processing hardware disposed on the substrate, the data processing hardware including at least one of an integrated circuit, a digital signal processor (DSP) chip, or a system on a chip (SoC). In these implementations, the substrate may define a planar face that is substantially parallel with planar surfaces defined by the front and back faces of the face plate.

The details of one or more implementations of the disclosure are set forth in the accompanying drawings and the description below. Other aspects, features, and advantages will be apparent from the description and drawings, and from the claims.

BACKGROUND

The security industry has the need for a door sensor that is easily installed and is not visible to the homeowner or a thief. Currently, the options for securing a door are to either use a sensor mounted to the door with a corresponding magnet mounted to the door frame or install a 'recessed sensor' that is mounted into the door and a magnet mounted into the door frame. The externally mounted sensor is relatively easy to install but has some disadvantages. First, the sensor and magnet are visible and detract from the aesthetics of the home. Secondly, it is sometimes hard to align the magnet with the door sensor, since the magnet or sensor must be mounted onto the trim as well as the door. The recessed sensor was designed to be a completely invisible install. The problem is that mounting the sensor and magnet is not an easy task. The door must be drilled with a large diameter bit to allow the sensor to be inserted into the door. Then, the door frame must be drilled to allow for a magnet to be inserted. In addition, the sensor is placed at the top edge of the door which requires a person to scale a three to six foot ladder in order to replace the sensor's internal battery. This can pose a major concern for older homeowners, or homeowners with physical disabilities

DESCRIPTION OF DRAWINGS

Like reference symbols in the various drawings indicate like elements.

DETAILED DESCRIPTION

Figure 1A:
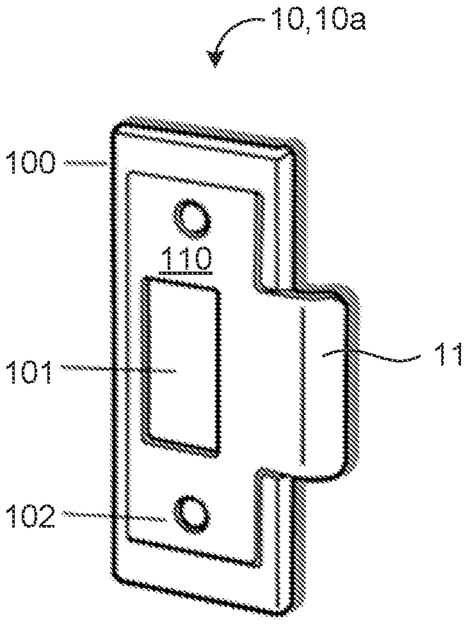
FIGS. 1A and 1B are schematic views of an example door position sensor including a strike plate, a control circuit, and a door sensor disposed on the control circuit.

Conventional door sensors are installed by either mounting the door sensor onto the door or by mounting the door sensor into a recessed hole that must be drilled into the door as part of the install process. These conventional door sensors are typically positioned at a top edge of the door requiring a user to use a ladder in order to access the sensor for maintenance, such as replacing an internal battery powering the sensor. Implementations herein are directed toward a door position sensor integrated with a strike plate (or door face plate) that is easily-accessible from the ground-level for maintenance and installation, that is invisible from view, and that that does not require any drilling, or otherwise altering, of an existing door (or door frame) when installing the strike plate integrated with the door position sensor.

All doors are mounted using a strike plate. The present disclosure leverages the strike plate to form a door position detector that integrates a door position sensor with the strike plate. Simply removing two screws allows the existing strike plate to be removed and replaced with the door position detector that integrates the door position sensor with the strike plate. In some implementations, the door sensor is integrated with a door handle assembly disposed on the door or in the latch bolt bore instead of the strike plate disposed on the door jamb. In other implementations, the door position sensor is integrated with a door face plate that mounts onto an edge of the door.

FIGS. 1A-7 illustrate example door position detectors 10, 10*a-g* integrated into at least one of a strike plate assembly, an existing mortise hole, a door handle assembly, or in a latch bolt bore. Each door position detector 10 may include at least one door position sensor configured to detect whether a door is in an open state or a closed state. As used herein, the door position sensor may be interchangeably referred to as a 'door sensor'. Additionally or alternatively, the door sensors may be configured to detect whether the door is in a locked state or an unlooked state. The door sensor may also be configured to detect when an object, such as a person, passes by the door and through the door opening. There are many techniques for using door sensors to determine the position of the door. These techniques include, but are not limited to, capacitance sensing, inductance proximity, infrared (IR) reflected sensors, hall effect sensors, magnoresistive, radar, proximity, light, temperature, etc. In capacitance sensing, components of the door position detector create different capacitance values for different states of the door. For instance, a first capacitance value may be associated with a closed door state and a second capacitance value may be associated with an open door state. Moreover, different capacitance values may indicate more granular position information such as whether the door is cracked slightly open, is fully open, or some position between slightly open and fully open. Similarly, different capacitance values may indicate whether the door is locked or unlocked, i.e., whether or door lock (e.g., bolt) is engaged to lock the door closed or disengaged so that the door is unlocked in the closed position. In these examples, the capacitance value may change when a deadbolt transitions between engaged and disengaged states. Capacitance sensed by a capacitance sensor may also change in response to gestures. Inductance values via inductance sensing may be similarly applied as the aforementioned capacitance values to ascertain different states of the door.

In some implementations, the door position detector includes a microphone configured to capture acoustic sounds in the environment of the door position detector. In these implementations, the door position detector may include a sound detection unit that is configured to detect whether acoustic sounds captured by the microphone are indicative of at least one of a door closing event, a door opening event, a door locking event, or a door unlocking event. Additionally or alternatively, the door position detector may provide voice recognition and/or speech recognition capabilities. For instance, a speech recognition unit may be able to recognize voice commands in speech audio captured by the microphone. Here, the speech recognition unit may perform speech recognition on the captured speech audio to determine whether a command to open, lock, or unlock the door. The command could also include a password to open, lock, or unlock the door. The speech recognition unit may include a speech recognition model/system executing on data processing hardware integrated into the door position sensor. The speech recognition model may be trained to recognize a set of predefined command phrases. Additionally, the speech recognition model may be trained to only detect key words/phrases indicative of command(s) to open, lock, or unlock the door.

The door position detector may include a voice recognition unit configured to detect whether speech audio captured by the microphone was spoken by an authorized person. For instance, one or more voice profiles (reference speaker embeddings) each associated with a respective may be stored on memory hardware of the door position detector (or on memory hardware of a remote device in communication with the door position sensor) and compared with a speaker embedding extracted by the voice recognition unit from the captured speech audio. When the speaker embedding extracted from the speech audio matches one of the voice profiles (reference speaker embeddings), the speaker of the speech audio may be deemed an authorized user, i.e., an individual authorized to at least one of open, close, lock, or unlock the door. The voice recognition unit may execute on data processing hardware of the door position detector. The data processing hardware of the door position detector 10 of FIGS. 1A-8 may be implemented on a printed circuit board (PCB) 103, 203 and include a system on a chip (SoC) processor or a digital signal processor (DSP) chip. As used herein, a PCB may include a flexible PCB (i.e., flex board) or a rigid PCB. The data processing hardware of the door position detector 10 may include other types of processors/computing chips.

The door position detector 10 may also include a communication interface (e.g., an RF/Bluetooth/NFC transmitter) for communicating the position/state of the door measured by the door sensor to a remote device, such as a security panel. The communication interface a receiver/transceiver capable of receiving communications from remote devices. The communication interface could also receive verification signals from a user computing device (e.g., smart phone or tablet) or an electronic key for permitting authorized users to open and/or lock/unlock the door. For instance, RF/NFC technology may communicate verification signals from the user computing device or electronic key that may be detected by the door position detector when the user computing device or electronic key is within a proximity range of the door position sensor 10. Similarly, tracking devices integrated in fall detection devices or other devices worn or carried by users could communicate location information to the door position detector when a user is proximity. The door position detector could function as a geo-fence to inform a remote device when a user has passed through the door. For instance, the door position detector could transmit a time stamp and notification to a security panel or PERS system to alert loved ones or monitoring personnel of the event.

The door position detector may further include an energy storage device (e.g., a battery) for power one or more components of the door position detector (e.g., the sensor, transmitter/receiver, data processing hardware, etc.). A battery housing may be integrated into the design of the door position detector. In some implementations, some or all of the components of the door position detector are integrated into a mortise hole/housing juxtaposed with the strike plate. This would permit the use of larger batteries to be used for powering components of the door position detector. Optionally, the door position detector 10 may include circuitry for using an external energy storage device to wirelessly charge the battery of the door position sensor. In such a scenario, the external energy storage device may be an existing energy storage device integrated into the door handle assembly for powering electrical components of the door handle assembly (e.g., an electronic keypad) and the door position detector 10 may be integrated with the strike plate and/or mortise hole. The wireless charging circuitry (e.g., conductive charging coils) may pass charging currents wirelessly from the external energy storage device to charge the battery of the door position detector.

Figure 1B:
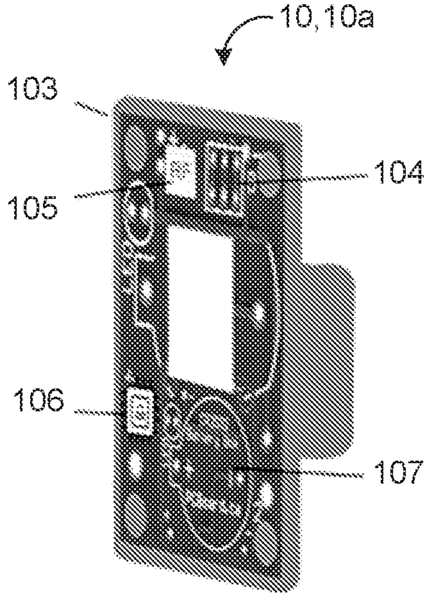

FIGS. 1A and 1B show the door position detector 10, **10*a* including a strike plate 100 that defines a bore hole 101 to permit passage of a lock bolt or strike latch 702 (FIG. 7) of a cooperating door handle assembly. The bore hole 101 aligns with a mortise hole 311 (FIG. 3) of a door frame/jamb 301 (FIG. 3) when the strike plate 100 is mounted onto the door frame/jamb. The strike plate 100 may be formed form metal or other suitable material. The strike plate 100 includes a back face 112 (FIG. 2B) and a front face 110 disposed on an opposite side of the strike plate 100 than the back face 112. The front face 110 defines a planar surface that opposes and is substantially parallel to an edge of the door when the door is in the closed position. The strike plate 100 may further define one or more mounting holes 102 configured to receive fastening members (e.g., screws) for mounting the strike plate 100** to the door frame/jamb.

The door position detector 10 further includes a control circuit 103 disposed on the strike plate 100. In the examples shown, the control circuit 103 includes a substrate (e.g., a printed circuit board (PCB) assembly) that opposes the back face 112 of the strike plate 100. The PCB assembly may be flexible (e.g., flex board) or substantially rigid. While the example shown depicts the substrate 103 disposed on the back face 112 of the strike plate 100 to implement the control circuit 103, other configurations may include the control circuit 103 integrally formed with the strike plate 100. In some examples, the control circuit 103 is embedded into the strike plate 100 between the front face 110 and the back face 112. For instance, the control circuit 103 including the substrate may be embedded into the strike plate 100 and not visible when viewing the exposed front and back faces 110, 112. In these examples, the strike plate 100 may be formed from one or more separate pieces that attach to enclose the substrate 103. The substrate 103 includes at least one of control circuitry 104, a communication interface (e.g. a RF transmitter/receiver/transceiver) 105, one or more door position sensors 106, and an energy storage device (e.g., battery) 107 for powering components of the door position detector 10. In some examples, the substrate 103 includes the same or smaller dimensions as the strike plate 100 so that the substrate 103 and components disposed thereon are concealed by the strike plate 101 when the strike plate 100 is mounted onto the door frame/jamb. In some examples, the substrate 103 defines one or more corresponding mounting holes that align with the mounting holes 102 defined by the substrate 103.

FIG. 1A shows the strike plate 100 of the door position detector 10*a* including a lip portion 11 that protrudes from the front and back faces 110, 112 of the strike plate 100. Here, the lip portion 11 includes a strike surface and a non-strike surface disposed on an opposite side of the lip portion than the strike surface. The strike surface is configured to initiate contact with a strike latch 702 (FIG. 7) of the cooperating door handle assembly. While the edge of the door and the door frame may obstruct the view of the front and back faces of the strike plate 100 when the door is in the closed position, the lip portion 11 may be exposed from the edge of the door and the door frame when the door is in the closed position. In some configurations, the strike and non-strike surfaces of the lip portion 11 are angled relative to planar surfaces defined by the front and back faces of the strike plate to facilitate engagement with a cooperating angled surface of the strike latch.

In some implementations, the control circuit 103 is disposed on the non-strike surface of the lip portion 11 of the strike plate 100 or embedded into the lip portion 11.

Figure 2A:
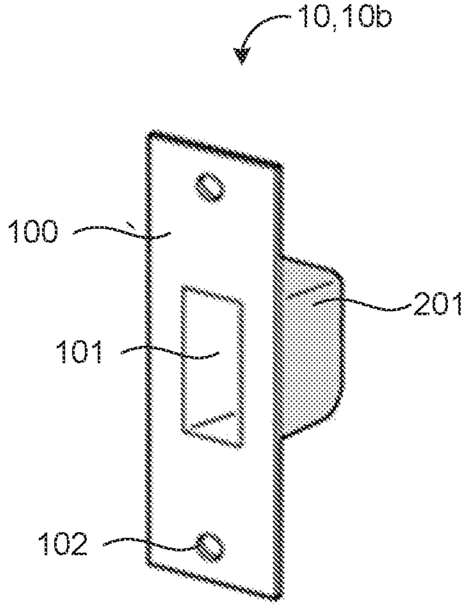
FIGS. 2A and 2B are schematic views of an example door position sensor including a stike plate defining a mortise housing, a control circuit disposed in the mortise housing, and a door sensor disposed on the control circuit.
Figure 2B:
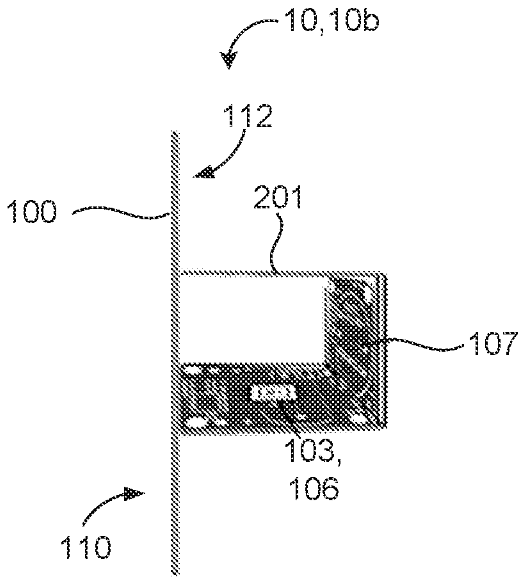

As such, the back face 112 (FIG. 2B) of the strike plate 100 may be in direct contact with the door frame while the control circuit 103 is only disposed on the non-strike surface of the lip portion of the strike plate 100 or embedded into the lip portion 11. While not shown, the control circuit 103 disposed on the non-strike surface of the lip portion 10 or embedded into the lip portion 10 may include the substrate with the door position sensor 106 and other components 104, 105, 107 disposed on the substrate 103. Accordingly, in these implementations, the substrate 103 (e.g., a PCB) may define a surface area that is less than or equal to a surface area defined by the non-strike surface of the lip portion 11 of the strike plate 100. As such, the substrate 103 may define a contour that follows a contour of the non-strike surface of the lip portion 11. The strike and non-strike surfaces of the lip portion define planar or curved contours. Referring to FIGS. 2A and 2B, in some implementations, the door position detector 10, 10*b* further includes a mortise housing 201 attached to the strike plate 100 and configured to extend into a mortise hole 511 (FIG. 5) when the strike plate 200 is mounted onto the door frame/jamb. In the example shown, the housing 201 defines an enclosure that may house the energy storage device (e.g., battery) 107 and the substrate 103. The housing 201 may include a flange or tab for mounting within the mortise hole. The housing 201 could mount to the mortise hole via a compression fit. Here, the substrate 103 may define a cylindrical-shaped or curved profile along an inner wall of the housing 201 that defines the enclosure. In some examples, the housing 201 is formed from the substrate 103. Notably, the enclosure may accommodate larger sized batteries. A portion of the substrate 103 may also be substantially flush with the back face of the strike plate 100 as shown in FIGS. 1A and 1B. Here, the door position sensor 106 and/or the communication interface 105 may be disposed on the portion of the substrate 103 that is flush with the strike plate 100 and the battery 107 may be disposed on the portion of the substrate 103 housed by the housing 201. In this configuration, the portion of the substrate 103 housed by the housing 201 may define a longitudinal axis that aligns with a longitudinal axis of the mortise hole and the portion of the substrate 103 that is flush with the strike plate 100 may define a longitudinal axis that is substantially parallel to planar surfaces of the strike plate 100 and perpendicular to the longitudinal axis of the portion of the substrate 103 housed by the housing 201

Figure 3:
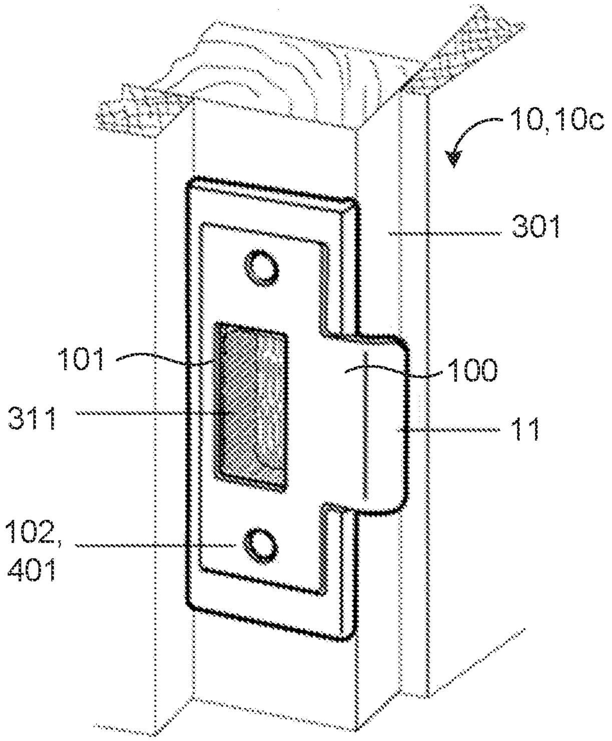
FIG. 3 is a schematic view of a door position detector including a strike plate mounted onto a door frame 301.

FIG. 3 shows the door position detector 10, 10*c* mounted onto the door jamb 301 via fasteners 401 that extend through corresponding mounting holes 102 defined by the strike plate 100. In configurations where the door position detector 10*c* includes a substrate 103, the substrate 103 may define corresponding mounting holes that align with the mounting holes 102 defined by the strike plate 100. The bore hole 101 defined by the strike plate 300 aligns with the mortise hole 311 in the door jamb 301 and permits passage of the lock bolt or strike latch 702 (FIG. 7) into the mortise hole 311.

Figure 4:
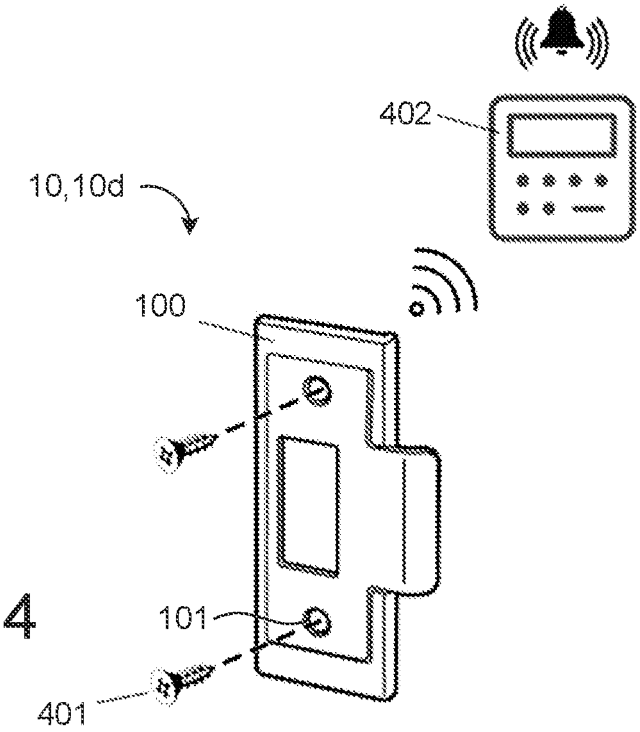
FIG. 4 is a schematic view of a door position detector in communication with a remote device to communicate a status of a door.

FIG. 4 the door position detector 10, 10*d* including the strike plate 100 defining the one or more mounting holes 102 configured to receive the fasteners (e.g., mounting screws) 401 for mounting the door position detector 10*d* onto the door jamb. Upon initial installation, when the mounting screws 401 pass through the strike plate 100 and are secured to make contact with the strike plate 100, the strike plate 100 may activate to perform a signal calibration for the door position detector 10*d*. Additionally or alternatively, the door position detector 10 may include a calibration button that a user may touch/press to perform signal calibration. Once calibrated, the strike plate 100 maintains a known signal range indicating when the door is either opened or closed. When a door is opened or closed, the sensor 106 transmits that status (i.e., a state of the door indicating opened or closed) to a remote device 402 to indicate the status/state of the door at any time. The remote device 402 may include a security panel or other signal receiver. In addition, the mounting screws 401 may also serve as a tamper switch that triggers an alert to the security panel 402 or other device when the screws 401 are removed.

Figure 5:
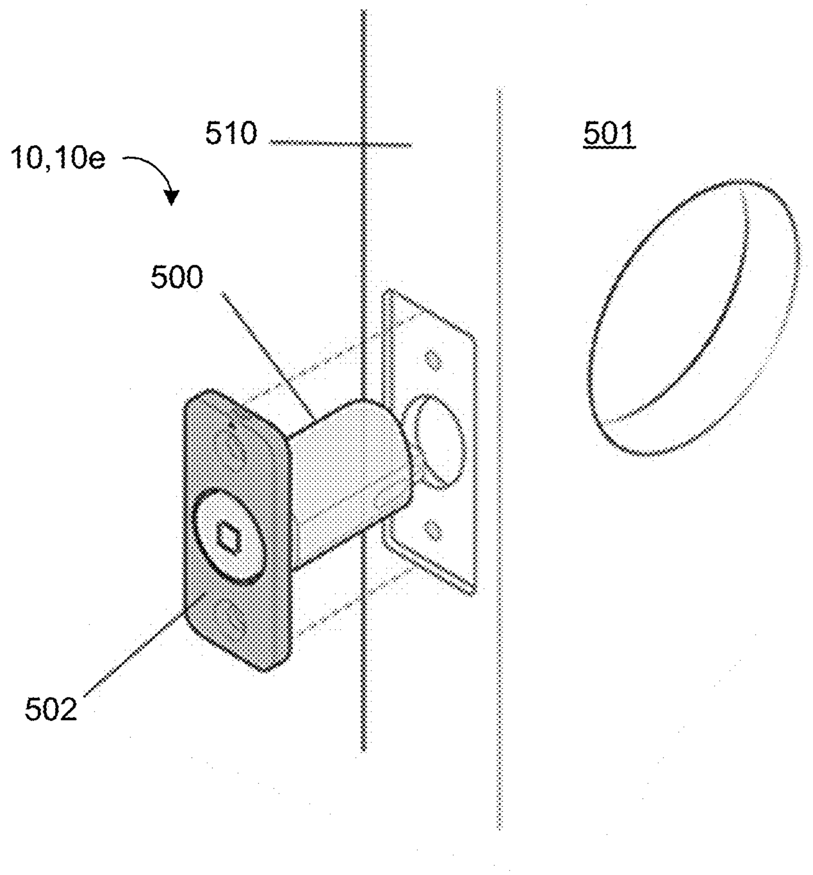
FIG. 5 is a schematic view of an example door position detector including a door lock assembly and a face plate.

Referring to FIG. 5, in some implementations, the door position detector 10, 10*e* is integrated as part of a door lock assembly 500 attached to an edge 510 of a door 501. In these implementations, the door position detector 10*e* includes a door face plate assembly 502 instead of the strike plate. Here, a substrate including the control circuitry, door position sensor, communication interface, battery and/or other components may be affixed to the door face plate assembly 502 that mounts onto the edge 510 of the door 501, rather than affixed to the strike plate 100 that mounts onto the door frame 301 as shown by the door position detector 10*c* of FIG. 3. Similarly, the substrate including the control circuitry could be integrally formed with the strike plate and/or embedded into the face plate assembly 502.

Figure 6:
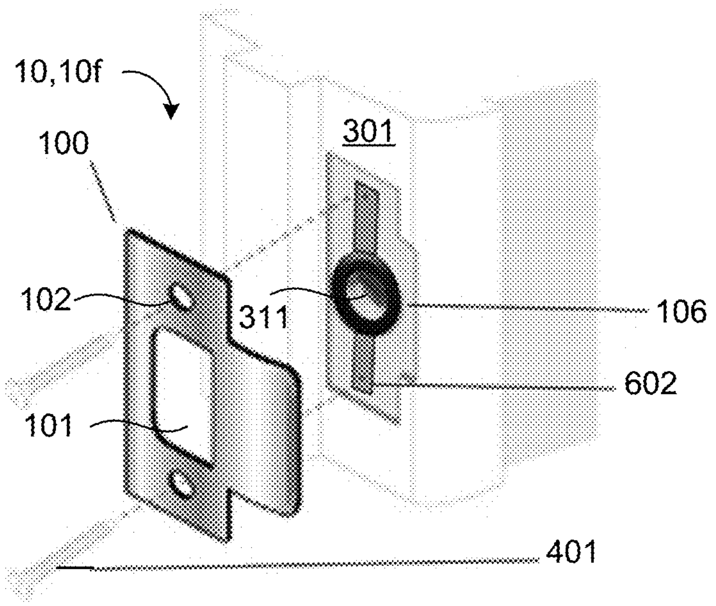
FIG. 6 is a schematic view of an example door position detector including a strike plate and a door position sensor mounted onto a door frame via mounting arms.

FIG. 6 shows an example technique for tamper sensing of a door position detector 10, 10*f* that includes the strike plate 100, a door position sensor 106 having a pair of mounting arms 602, and fasteners (e.g., mounting screws) 401 for mounting the strike plate 100 onto a door frame/jamb 301. In this example, the door position sensor 106 and battery (not shown) is inserted into the mortise hole 311 while the mounting arms 602 are substantially parallel with the back face of the strike plate 100. The mounting screws 401 pass through the mounting holes 102 of the strike plate 600 as well as the mounting arms 602 of the door position sensor 601 and secure to the door jamb 311 to mount the strike plate 100 such that the bore hole 101 is aligned with the mortise hole 311. Here, the strike plate 100, mounting screws 401, and mounting arms 602 may create a conductive circuit. Tampering may be sensed when the mounting screws 401 are removed to cause the conductive circuit to short.

Figure 7:
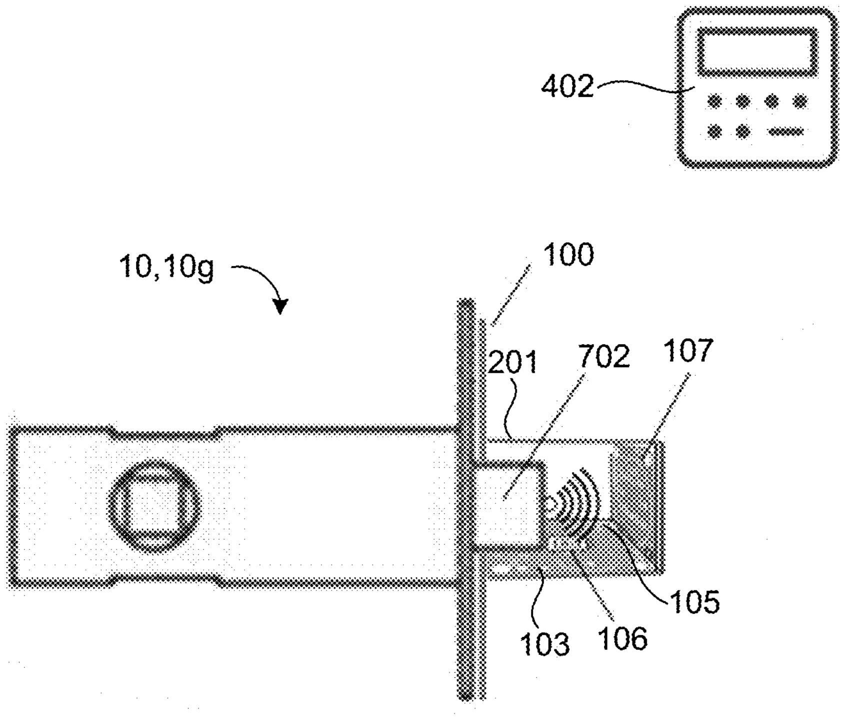
FIG. 7 is a schematic view of an example door position detector communicating a state of a door when a strike latch enters a mortise hole formed through a door jamb.

Referring to FIG. 7, the door position detector 10, 10*g* includes the door position sensor 106 and the battery 107 disposed within the mortise hole 311 or a mortise hole housing 201 that extends into the mortise hole as described above with reference to the door position detector 10*b* of FIGS. 2A and 2B. The detector 10*g* may include the substrate 103 disposed within the housing 201 that includes the sensor 106, battery 107, and any of the other components described throughout the present disclosure. Here, the strike plate 100, when mounted onto the door jamb may cause surfaces of the sensor 106 and the strike plate 100 to create an electrical circuit when contacting one another. When a cooperating door lock bolt or strike latch 702 enters the mortise hole to close a door, the sensor 106 may create a wireless signal connection indicating a door closed state that may be communicated via the communication interface 105 to a remote device 402. Notably, the strike plate 100 and/or strike latch 702 may operate as additional door position sensors that cooperate with the door position sensor 106 to determine the state of the door. The remote device could include a monitoring device (e.g., security panel) for a security system.

Implementations of the present disclosure provide techniques for detecting/sensing a position/state of a household door, office door, etc. designed into the strike plate or lock assembly to provide a door position detector allowing for a wireless communication signal to be transmitted from the door position detector to an alarm monitoring panel. The door position detector and associated one or more door position sensors may be adapted to transmit a vast array of information such as door status (open/closed, locked/unlocked), alarm status (armed/disarmed), etc. The door position sensors may use a wide arrange of technologies such as, without limitation, capacitive, inductive, radar, RF, magnetic, proximity, light, temperature or any other sensing method known now or in the future. The door position sensor may communicate via a communicate interface that uses any known or future wireless communication standard such as, without limitation, Wi-Fi, cellular, RF, Sub-Gig, millimeter-Wave, Bluetooth, BLE, Z-Wave, and Zigbee to name just a few.

The door position detector 10, 10*a-g* described herein may be employed in residential homes as part of a home intrusion alarm system. Here, the door position detector 10 may communicate the state of the door to the alarm system, thereby causing the alarm system to trigger a home intrusion alarm when the door is transitioned into an open state during a time when the alarm is armed. Similarly, the door position detector 10 in the residential setting could be used as an internet of things (IOT) device in a network of IOT devices. For instances, a user could have a phone app and could continuously monitor the state of the door by checking whether the door is locked or unlocked and could issue commands to lock or unlock the door as needed.

Mounting screws or other types of fasteners used to mount the door position detector on the door frame/jamb (i.e., when door position detector includes a strike plate) or on the door edge (i.e., when the door position detector includes a face plate) may also function as a tamper switch. Here, when the screws are fastened to the jamb or door edge and in contact with the strike plate or face plate, an electrical circuit is created. When the screws are loosened removed the electrical circuit shorts and triggers a tamper alert that is communicated to a remote unit, such as an alarm panel and/or a user device. Similarly, upon mounting the door position detector via fasteners (e.g. mounting screws), the door position sensor may trigger a calibration routine where the door position sensor calibrates its position, alignment, capacitance, inductance, etc., and stores these values on memory hardware, e.g., an integrated circuit of the door position detector. The door position detector could have a dedicated calibration button that can be activated once the detector is installed and ready to be calibrated.

In some implementations, the door position detector is configured to recognize time intervals between door opening and closing events and transmit a notification to a remote device when the door is left in an open state for a length of time that exceeds a time threshold.

In some implementations, components such as the battery and door position sensor are located within a housing that is recessed into the mortise located directly behind the mounted strike plate on the doorframe. When a door lock is installed, the lock bolt would travel through the strike plate and enter the sensor housing located in the bore hole. The housing could be made from a varying range of materials such as, but not limited to plastic, metal, rubber, or any other material available today or in the future.

In additional implementations, the door position detector is used in conjunction with other devices such as, without limitation, panic buttons, help buttons, fall sensors and other similar wireless devices used to address sudden emergencies in the service known as the Personal Emergency Response System (PERS) industry. When a device worn or carried by a user passes by the sensor it could provide tracking information similar to a geo-fencing model. A time stamp and notification could be sent to the security panel or PERS system to alert loved ones or monitoring personnel of the event.

In some examples, the door position sensor may measure capacitance values when a door knob/handle/lever of the door is touched. When the capacitance value satisfies certain thresholds, the door position sensor could interact with a wide range of devices such as, without limitation, internal or external lights, audio alerts/sirens, or other devices as part of an IOT network. The door position detector could further fetch an identifier of the user from his/her smart phone responsive to a capacitive change indicative of the user touching the door knob/handle/lever. Here, the door position detector can use the identifier to verify whether or not the user is authorized to access the door. When the user is verified as an authorized user, the door position detector or other device could automatically unlock the door. Conversely, when the user is not verified, the door may remain locked requiring the user to provide additional verification means, e.g., entering code on a keypad or inserting a physical key to unlock the door A door position sensor or other sensor integrated into the door position detector could obtain biometric/biomedical information from a user. For instance, biometric information could be obtained from a user under duress that touches a cooperating door knob/handle/lever, thereby causing the door position sensor to alert first responders or caregivers of the user's biometric/biomedical status.

In some examples, the door position sensor is configured to detect passage through an open door. Here, the door position sensor may be installed on a strike plate or within a mortise hole. The door position sensor may include a light detector, heat/infrared detector, radar, or any other type of sensor capable of detecting events indicative of an object passing through an open door. This sensor may activate only when the sensor or another door position sensor determines that the door is in an open state.

In additional implementations, door hardware such as hinge pins may include sensors (e.g., strain gauge, rotational position sensor, etc.) that measure information that indicates a current door state (open/closed, locked/unlocked). The door hardware may communicate the measured information to the door position detector installed on the doorframe or the door faceplate. Temperature sensors could also be installed on various hardware components and communicated with the door position detector to detect events such as fires. The door position detector may also integrate a temperature sensor on the substrate without departing from the scope of the present disclosure.

The wireless door position sensor described herein may further be inserted into the mortise hole of a door lock assembly, while the strike plate would be mounted on the door jamb over the mortise hole using mounting screws so that when the strike plate contacts the sensor it creates a conductive contact that transmits a status signal to a remote device. Similarly, the door position detector will transmit a status signal indicating when conductive contact is broken. Additionally or alternatively, surfaces of the strike plate when mounted via mounting screws may create an electrical contact circuit that may be leveraged as a tamper switch such that removing any of the screws will break the electrical circuit. Timestamped notifications may be sent to a remote device each time the electrical circuit is established and/or broken.

In configurations where the door position sensor is disposed within the mortise hole or behind the strike plate, a lock bolt or strike latch entering the mortise hole during a door closing event may create an electronic connection with an existing circuit between strike plate and door position sensor. Each time this electronic connection is established (e.g., door closing event) or removed (e.g., door opening event), a timestamped notification may be transmitted to a remote device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 8:
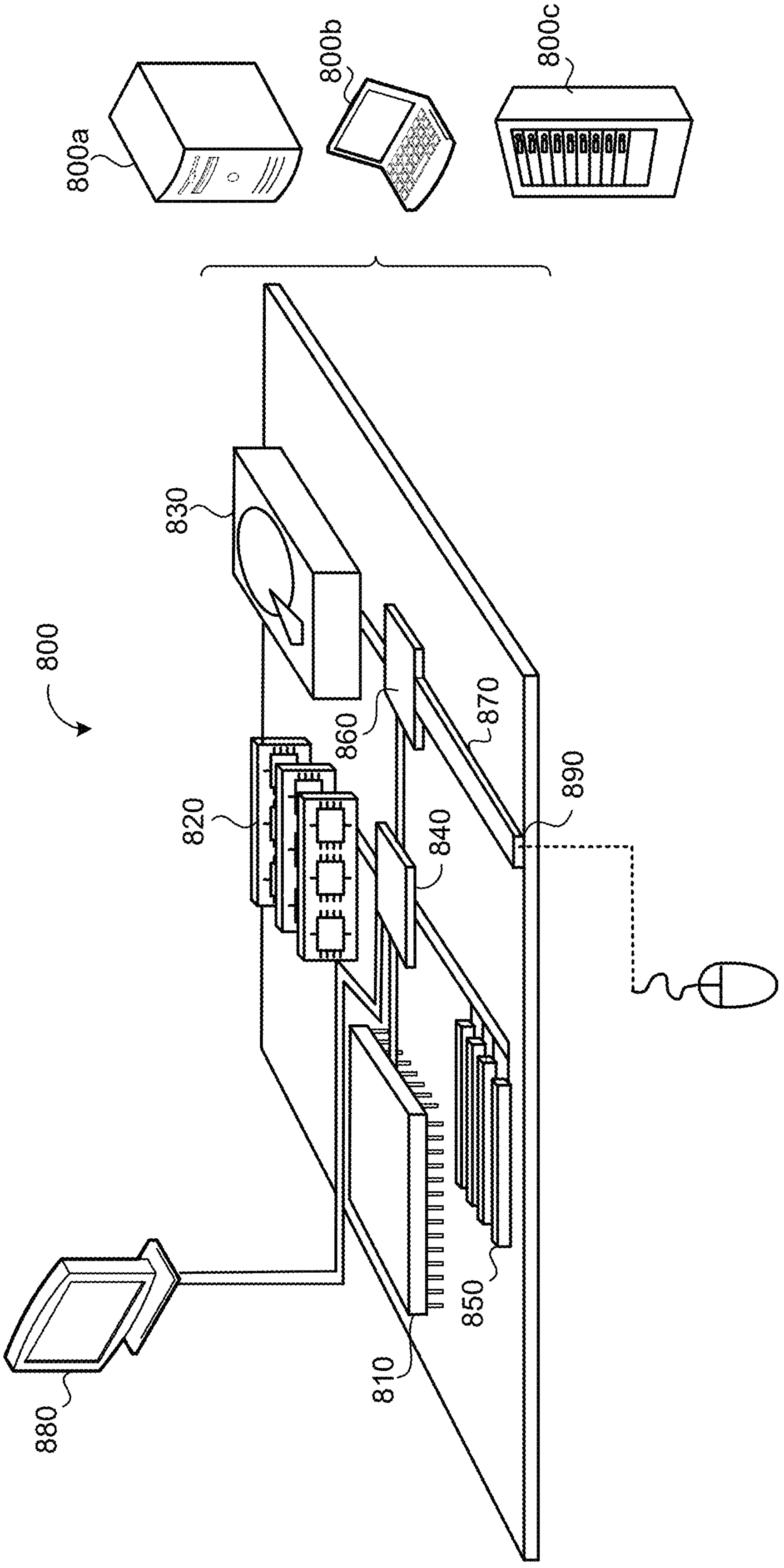
FIG. 8 is a schematic view of an example computing device that may be used to implement the systems and methods described herein.

FIG. 8 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The computing device 800 may represent the door position detector 10 of FIGS. 1-7. The components shown here, their connections and relationships, and their functions, are meant to be exemplary only, and are not meant to limit implementations of the inventions described and/or claimed in this document.

The computing device 800 includes a processor (e.g., data processing hardware) 810, memory (e.g., memory hardware) 820, a storage device (e.g., memory hardware) 830, a high-speed interface/controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be an integrated circuit, computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800*a* or multiple times in a group of such servers 800*a*, as a laptop computer 800*b*, or as part of a rack server system 800*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A door position detector comprising:

a strike plate mounted onto a door frame, the strike plate comprising a back face that opposes the door frame and a front face disposed on an opposite side of the strike plate than the back face and opposing an edge of a door when the door is in a closed position;

a door position sensor integrated with the strike plate, the door position sensor configured to detect a state of the door;

a control circuit disposed on the strike plate or embedded into the strike plate, wherein:

the control circuit comprises a substrate;

the door position sensor is disposed on the substrate; and the substrate is inserted into a mortise hole and defines a substantially cylindrical or rounded shape, the substrate defining a longitudinal axis that aligns with a longitudinal axis of the mortise hole.

2. The door position detector of claim 1, wherein the door position sensor is configured to detect at least one of a door open state, a door closed state, a locked state, or an unlocked state.

3. The door position detector of claim 1, wherein the door position sensor comprises a capacitance sensor, inductance sensor, a proximity sensor, infrared (IR) reflected sensor, hall effect sensor, magnoresistive sensors, radar, light sensor, or temperature sensor.

4. The door position detector of claim 1, further comprising a communication interface integrated with the strike plate, the communication interface configured to transmit the state of the door detected by the door position sensor to a remote device.

5. The door position detector of claim 1, further comprising a control circuit integrally formed with the strike plate.

6. The door position detector of claim 1, wherein the substrate comprises a printed circuit board (PCB).

7. The door position detector of claim 1, further comprising data processing hardware disposed on the substrate, the data processing hardware comprising at least one of an integrated circuit, a digital signal processor (DSP) chip, or a system on a chip (SoC).

8. The door position detector of claim 1, wherein the substrate defines a planar face that is substantially parallel with planar surfaces defined by the front and back faces of the strike plate.

9. The door position detector of claim 1, further comprising a mortise housing inserted into the mortise hole and enclosing the substrate.

10. The door position detector of claim 1, further comprising an energy storage device configured to power components of the door position detector.

11. The door position detector of claim 1, further comprising one or more additional door position sensors integrated with the strike plate, each of the one or more additional door position sensors configured to detect the state of the door.

12. The door position detector of claim 11, wherein the one or more additional door position sensors comprises at least one of the strike plate or a face plate mounted onto the edge of the door.

13. A door position detector comprising:
- a strike plate mounted onto a door frame, the strike plate comprising a back face that opposes the door frame and a front face disposed on an opposite side of the strike plate than the back face and opposing an edge of a door when the door is in a closed position, wherein the strike plate comprises a lip portion that protrudes from the front and back faces of the strike plate, the lip portion comprising a strike surface and a non-strike surface disposed on an opposite side of the lip portion than the strike surface, the strike surface configured to initiate contact with a strike latch of the door when the door is transitioning into the closed position;
- a door position sensor integrated with the strike plate, the door position sensor configured to detect a state of the door; and
- a control circuit embedded into the lip portion of the strike plate or disposed on the non-strike surface of the lip portion of the strike plate, wherein:
  - the back face of the strike plate is in direct contact with the door frame;
  - the control circuit comprises a substrate;
  - the door position sensor is disposed on the substrate; and
  - the substrate defines a surface area that is less than or equal to a surface area defined by the non-strike surface of the lip portion of the strike plate.

14. The door position detector of claim 13, wherein the substrate comprises a printed circuit board (PCB).

15. The door position detector of claim 13, further comprising data processing hardware disposed on the substrate, the data processing hardware comprising at least one of an integrated circuit, a digital signal processor (DSP) chip, or a system on a chip (SoC).

16. The door position detector of claim 13, wherein the substrate defines a contour that follows a contour of the non-strike surface of the lip portion of the strike plate.

17. The door position detector of claim 13, wherein the lip portion of the strike plate is angled relative to planar surfaces defined by the front and back faces of the strike plate.

18. A door position detector comprising:
- a face plate mounted onto an edge of a door, the face plate comprising a back face that opposes the edge of the door and a front face disposed on an opposite side of the back face and opposing a door frame when the door is in a closed position;
- a door position sensor integrated with the face plate, the door position sensor configured to detect a state of the door; and
- a control circuit disposed on the face plate or embedded into the face plate, wherein:
  - the control circuit comprises a substrate;
  - the door position sensor is disposed on the substrate; and
  - the substrate defines a planar face that is substantially parallel with planar surfaces defined by the front and back faces of the face plate.

19. The door position detector of claim 18, wherein the door position sensor is configured to detect at least one of a door open state, a door closed state, a locked state, or an unlocked state.

20. The door position detector of claim 18, wherein the door position sensor comprises a capacitance sensor, inductance sensor, a proximity sensor, infrared (IR) reflected sensor, hall effect sensor, magnoresistive sensors, radar, light sensor, or temperature sensor.

21. The door position detector of claim 18, further comprising a communication interface integrated with the face plate, the communication interface configured to transmit the state of the door detected by the door position sensor to a remote device.

22. The door position detector of claim 18, further comprising a control circuit integrally formed with the face plate.

23. The door position detector of claim 18, wherein the substrate comprises a printed circuit board (PCB).

24. The door position detector of claim 18, further comprising data processing hardware disposed on the substrate, the data processing hardware comprising at least one of an integrated circuit, a digital signal processor (DSP) chip, or a system on a chip (SoC).

25. The door position detector of claim 18, further comprising an energy storage device configured to power components of the door position detector.

* * * * *